Patented Mar. 19, 1929.

1,706,154

UNITED STATES PATENT OFFICE.

ROBERT T. GILLETTE, OF SCHENECTADY, NEW YORK, ASSIGNOR TO GENERAL ELECTRIC COMPANY, A CORPORATION OF NEW YORK.

BRAZING ALLOYS.

No Drawing.   Application filed June 22, 1927. Serial No. 200,774.

The present invention relates to brazing alloys.

It is one of the objects of the invention to provide an alloy which may be produced at reasonably low cost and employed generally wherever ordinary commercial silver solder alloys may be employed on metals that melt at about 1000° C or higher.

Ordinary silver solder which contains approximately 50 percent silver, 33 percent copper and 17 percent zinc has certain disadvantages. For example, the zinc content has a tendency to vaporize at a temperature as low as 420° C. and thereby raise the melting point of the alloy, and the large amount of silver present makes the use of the alloy very expensive.

According to the present invention, I make a brazing alloy consisting of approximately 84 percent copper, 8 percent tin and 8 percent silver. Such an alloy has a melting point of about 925° C. and may be employed to braze copper to cast iron or Monel metal cast iron to cast iron, copper to copper and to braze most metals and alloys that melt above 1000° C. In brazing copper to cast iron the ordinary brazing alloys will not stick to the cast iron but will boil or gas in the hydrogen atmosphere usually employed in such a brazing operation. Attempts have been made to overcome this difficulty by decarbonizing the surface of the cast iron. The present alloy will firmly unite copper and cast iron in a hydrogen atmosphere even when the cast iron has not been subjected to any preliminary treatment, the line of junction between the copper and cast iron being indistinguishable.

I have found that in the present alloy a content of about 8 percent tin gives the most advantageous results. If this content is lowered the melting point of the alloy is raised, while if the tin content is increased slightly, say to 10 percent, the alloy is rendered too brittle. The copper content may be lowered if the silver content is increased. Such a variation, however, obviously is undesirable, since the cost of the resulting alloy will be unnecessarily increased and no advantage obtained by the increased amount of the silver.

What I claim as new and desire to secure by Letters Patent of the United States, is:

1. A brazing alloy consisting mainly of copper but containing about 8% tin and an appreciable amount of silver, said alloy having a melting point in the neighborhood of 925° C.

2. A brazing alloy containing approximately 84 percent copper, 8 percent tin and 8 percent silver.

In witness whereof, I have hereby set my hand this 21st day of June, 1927.

ROBERT T. GILLETTE.